United States Patent
Dames et al.

(10) Patent No.: US 12,123,756 B2
(45) Date of Patent: Oct. 22, 2024

(54) INSERT-TYPE ELECTROMAGNETIC FLOW METER

(71) Applicant: XYLEM EUROPE GMBH, Schaffhausen (CH)

(72) Inventors: Andrew Dames, Cambridge (GB); Vincenzo Piazza, Newmarket (GB); Mathew Price, Cambridge (GB); Hilary Meanwell, Saffron Walden (GB); Michael Cantor, Highfield Avenue (GB); Riccardo Di Pietro, Cambridge (GB)

(73) Assignee: XYLEM EUROPE GMBH, Schaffhausen (CH)

( * ) Notice: Subject to any disclaimer, the term of this patent is extended or adjusted under 35 U.S.C. 154(b) by 370 days.

(21) Appl. No.: 17/631,912

(22) PCT Filed: Feb. 18, 2020

(86) PCT No.: PCT/EP2020/054269
§ 371 (c)(1),
(2) Date: Feb. 1, 2022

(87) PCT Pub. No.: WO2021/018419
PCT Pub. Date: Feb. 4, 2021

(65) Prior Publication Data
US 2022/0283005 A1     Sep. 8, 2022

(30) Foreign Application Priority Data
Aug. 1, 2019   (GB) ..................... 1910986

(51) Int. Cl.
*G01F 1/58*   (2006.01)
*G01F 1/60*   (2006.01)
*G01F 15/02*  (2006.01)

(52) U.S. Cl.
CPC ............... *G01F 1/588* (2013.01); *G01F 1/60* (2013.01); *G01F 15/024* (2013.01)

(58) Field of Classification Search
CPC .......... G01F 1/588; G01F 1/60; G01F 15/024
See application file for complete search history.

(56) References Cited

U.S. PATENT DOCUMENTS 3,191,119 A * 6/1965 Singer ..................... G01F 1/716
                                                          600/407
4,554,828 A    11/1985 Doll
(Continued)

FOREIGN PATENT DOCUMENTS

CN      105 928 573 A      9/2016
EP        0 892 251 A1     1/1999
(Continued)

OTHER PUBLICATIONS

International Preliminary Report on Patentability (IPRP) Form PCT/IB/373, including Written Opinion of the International Searching Authority (ISA/EP) Form PCT/ISA/237, for International Application No. PCT/EP2020/054269 filed Feb. 18, 2020, IPRP mailed from the International Bureau on Feb. 10, 2022, 9 pages.

(Continued)

*Primary Examiner* — Peter J Macchiarolo
*Assistant Examiner* — John M Royston
(74) *Attorney, Agent, or Firm* — Ware, Fressola, Maguire & Barber LLP

(57) ABSTRACT

An insert-type electromagnetic flow sensor is disclosed. The flow sensor comprises an insert, first and second electrodes supported on opposite sides of the insert and a drive coil housed in the insert. The drive coil is offset from a midpoint between the first and second electrodes and/or a width of the drive coil between the first and second opposite sides at least partially overlaps with respective inner portions of the first (Continued)

and second electrodes. The drive coil includes at least five turns.

20 Claims, 14 Drawing Sheets

(56) References Cited

U.S. PATENT DOCUMENTS

| | | | |
|---|---|---|---|
| 2017/0248452 A1* | 8/2017 | Abrolat | G01F 1/588 |
| 2018/0216978 A1* | 8/2018 | Dames | G01F 15/18 |

FOREIGN PATENT DOCUMENTS

| | | |
|---|---|---|
| EP | 3 435 040 A1 | 1/2019 |
| JP | 2005 180962 A | 7/2005 |
| JP | 2007 147631 A | 6/2007 |

OTHER PUBLICATIONS

International Search Report, International Application No. PCT/EP2020,/054269, showing categories, 6 pages.
Written Opinion of the ISA/EPt, International Application No. PCT/EP2020,/054269, 8 pages.
Machine translation of JP 2007-147631 A, 15 pages.
Machine translation of JP 2005-180961 A, 13 pages.
Machine translation of CN 105928573 A, 9 pages.
Machine translation of EP 0892251 A1, 7 pages.

\* cited by examiner

INSERT-TYPE ELECTROMAGNETIC FLOW METER

BACKGROUND

The present invention relates to an insert-type electromagnetic flow meter.

Flow of fluid can be measured by using a variety of different ways, such as differential pressure, mechanical displacement (for example, using impellers, turbines or paddles), vortex sensors and ultrasound.

Flow meters can suffer one or more drawbacks. For example, some types of flow meters, such as those based on differential-pressure and mechanical-displacement flow sensors, can suffer from clogging. Other types of flow sensor, particularly those based on ultrasonic time of flight and electromagnetic flow meters are vulnerable to deposits which tend to degrade their performance.

SUMMARY

According to a first aspect of the present invention there is provided an insert-type electromagnetic flow meter. The flow sensor comprises an insert, first and second electrodes supported on opposite sides of the insert and a drive coil housed in the insert. The drive coil is offset from a midpoint between the first and second electrodes and/or a width of the drive coil between the first and second opposite sides at least partially overlaps with respective inner portions of the first and second electrodes. The drive coil includes at least five turns.

By offsetting the drive coil and/or by arranging the drive coil and the electrodes to overlap (as seen along an axis of flow), the flow sensor can be made narrower.

The drive coil may be wound around a core. The core may be formed of or comprise a magnetic material. The core may be formed of or comprise a non-magnetic material, such as a ceramic, or air. The drive coil may comprise between 5 and 400 turns. The drive coil may comprise between too and 200 turns.

The magnetic material may be a semi-hard magnetic material. Herein, a semi-hard magnetic material is defined as a magnetic material having a coercivity, $H_C$, in a range between 1 and 25 kA/m (1 kA/m≤$H_C$≤25 kA/m) and a remanence, Br, in a range between 0.6 and 1.5 T (0.6 T≤Br≤1.5 T). Examples of semi-hard magnetic materials include Vacozet® 258, CoCrFe, 3% cobalt steel, 17% cobalt steel, Remalloy and Vicalloy II.

The insert may comprise a main body portion and the insert (or "insert body portion") extends away from the main portion.

The drive coil may be offset in front of or behind the first and second electrodes. There may be two drive coils, one or both with or without cores, one in front and one behind the first and second electrodes.

The insert may comprise a sleeve-like body portion extending from a first end to a second closed end along a first axis, wherein the body portion is elongated along a second axis perpendicular to the first direction to define a front and a back of the body and opposite sides of the body between the front and the back, the body comprising a peripheral wall defining the front, back and opposite sides and a cavity therein, the body portion further comprising a cap closing the cavity at the second end. The first and second electrodes may extend through the peripheral wall on the opposite sides of the body portion at a position between the first and second ends, the first and second electrodes defining a midline between the first and second electrodes running parallel to the first axis. The coil extending along a central axis which is parallel to the first axis and which is offset from the midline along the second axis The insert may have a width between the opposite sides greater than 0 mm and less than or equal to 15 mm, greater than 2 mm and less than or equal to 6 mm or greater than 3 mm and less than or equal to 4.5 mm.

The first and second electrodes may comprise first and second stubs respectively, each stub comprising a disc having a centre and a shaft extending away, perpendicularly, from the centre of the disc. The first and second electrodes may each be seated in a respective stepped hole in the insert, each step hole having an annular step. The flow sensor may further comprise first and second 'O'-rings, wherein each 'O'-ring is interposed between a disc and an annular step.

The flow sensor may further comprise a printed circuit board having first and second terminals and first and second connectors. The first and second electrodes may be connected to the first and second terminals via the first and second connectors respectively. Alternatively, the first and second electrodes and the first and second connectors are integrated into first and second integrated (or "single-piece") components, respectively.

The insert may have a length less than or equal to 25 mm and/or between 8 mm and 25 mm and/or between 9 mm and 17 mm. The insert may insertable through a hole having a diameter less than or equal to 15 mm and/or between 5 mm and 15 mm or less than or equal to 10.7 mm and/or between 5 mm and 10.7 mm.

The insert may be elongated along a first axis (or "longitudinal axis") and the drive coil is wound around an axis parallel to the first axis.

The core may have no pole pieces.

The first and second electrodes may be arranged to be co-axial on a centre line, the flow sensor arranged so that when inserted into a flow, the centre line is perpendicular to the flow.

The flow sensor may be arranged to be inserted in a pipe having a central axis, wherein the pipe and flow sensor are configured such that the centre line is perpendicular to the pipe central axis.

The insert is preferably vane-shaped and/or the faces of the insert are parallel where the electrodes are mounted.

Herein, vane-shaped (or "wing-shaped") is intended to mean a generally flat, elongate structure between first and second ends which has a front, a rear and first and second opposite sides between front and rear. The front and rear may be rounded. The front and/or rear may take the form of an edge formed where between tapering opposite sides meet. The structure may be wider at the front than at the back or vice versa. The structure may have a waist between the front and back.

Respective interfaces between the insert and first and second electrodes may be sealed using elastomeric material and/or potting material, such as silicone or epoxy.

The insert may have first and second ends (or "top" and "bottom", respectively). The first and second electrodes may be disposed in a plane midway between the first and second ends. The first and second electrodes may be disposed in a plane above or below midway between the first and second ends.

The insert preferably comprises an electrically-insulating material.

A first distance, A, between the first and second electrodes along a shortest circumference of the insert may be less than a second distance, B, between the first and second electrodes along a path passing around a distal end of the insert (i.e., A<B). The first distance may be less than half the second distance (i.e., A<0.5B). In some arrangements, for example if the electrodes are disposed near the bottom of the insert, then the first distance may be greater than the second distance (i.e., A>B).

The drive coil and core may be configured such that an energy needed to reverse magnetisation of the core is less than 1 mJ and/or between 0 and 1 mJ.

The drive coil may have outer diameter less than or equal to 2.95 mm and/or between 1.50 mm and 2.95 mm and a length less than or equal to 14 mm and/or between 7 mm and 14 mm.

The first and second electrodes may have first and second faces respectively which are outwardly facing and wherein a distance between the first and second faces are less than 15 mm and/or between 2 mm and 15 mm or less than 10 mm and/or between 2 mm and 10 mm.

The distance between the first and second faces may be less than 7 mm and/or between 3 mm and 7 mm. The distance between the first and second faces may be less than 4.5 mm and/or between 4 mm and 7 mm.

The flow sensor may further comprise first and second retainers, wherein the first and second retainers are arranged to cause the first and second electrodes respectively to be retained in the insert.

The first and second retainers are preferably electrically conductive and provide first and second electrical connections between a sensor electronic circuit and the first and second retainers, respectively.

The first and second retainers may be configured to hold the first and second electrodes by respective first and second interference fits. Each retainer may comprise a hole for forming an interference fit with a corresponding portion of the electrode. Each retainer may comprise a forked end for forming an interference fit with a corresponding portion of the electrode. The corresponding portion of the electrode may be a shaft. The insert and first and second electrodes may be configured such that the first and second electrodes are insertable into the insert along an axis perpendicular to a longitudinal axis of the insert. The insert and first and second retainers may be configured such that the first and second retainers are insertable into the insert along an axis parallel to a longitudinal axis of the insert.

The flow sensor may further comprise a magnetic-field sensing element. The magnetic-field sensing element may be an inductor, such as a coil. The coil may be wound around a ceramic.

The faces of the electrodes may be flush with corresponding outer surfaces of the insert. The faces of the electrodes may lie within 0.4 mm of corresponding outer surfaces of the insert, for example, be recessed by no more than 0.4 mm.

According to a second aspect of the present invention there is provided a flow measurement system comprising the flow sensor and a wall having an aperture, wherein the flow sensor is inserted in the aperture.

The wall may be part of structure which defines a lumen, such as a pipe or passage in a pump. The wall may be an outer wall of a hull of a boat or ship.

According to a third aspect of the present invention there is provided a flow measurement system comprising the flow sensor and an extended structure supporting the flow sensor.

BRIEF DESCRIPTION OF THE DRAWINGS

Certain embodiments of the present invention will now be described, by way of example, with reference to the accompanying drawings, in which.

DETAILED DESCRIPTION OF CERTAIN EMBODIMENTS

Introduction

Figure 1:
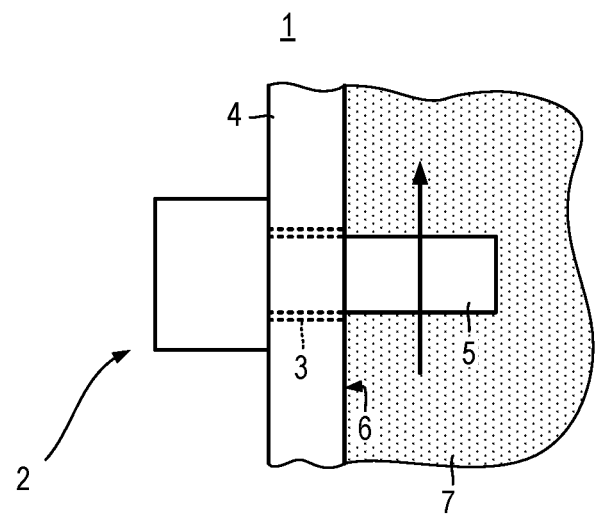
FIG. 1 is a schematic side view of a flow measurement system.

Referring to FIG. 1, a flow measurement system 1 is shown in which an insert-type (or "insertion") electromagnetic flow sensor 2 (herein also referred to simply as a "flow sensor") is inserted in an aperture 3 (or "through-hole") in a wall 4.

The electromagnetic flow sensor 2 is inserted into the aperture 3 such that at least one part 5 protrudes beyond a fluid-facing surface 6 of the wall 4 into an electrically-conductive fluid 7, typically water or a mixture which includes water.

The wall 4 may form part of structure which defines a lumen ("space", "closed channel" or "conduit"), such as a pipe or passage in a pump (not shown). Alternatively, the wall 4 may form a boundary to an open system. For example, the wall 4 may be an outer wall of a hull of a boat (not shown). The sensor 2 may be mounted at a distal end of a pole or other type of extended structure (not shown) and held in a flow of fluid, such as a river. The sensor 2 may be totally immersed.

The flow sensor 2 can be retained using a clip (not shown) and sealed onto a machined face using an 'O'-ring (not shown). Alternatively, the flow sensor 2 can be screwed into the wall 4 with a mechanical stop (not shown) to ensure correct alignment. Other retaining arrangements such as a bayonet fitting, adhesive, press-fitting and the like may be used.

Electromagnetic Flow Sensor 2

Housing

Figure 2:
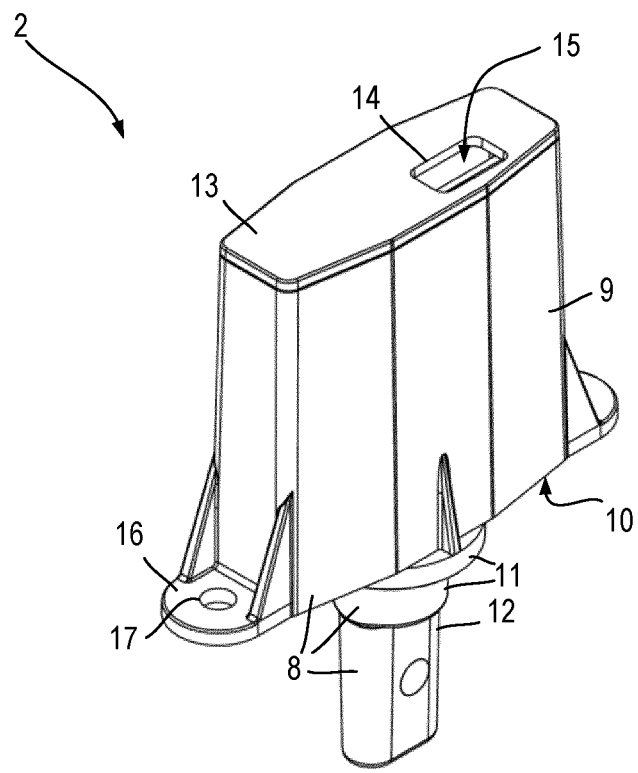
FIG. 2 is a perspective view of an insert-type electromagnetic flow sensor.

Referring to FIG. 2, the flow sensor 2 comprises a housing 8 (herein also referred to as a "body" or "case") formed, for example by injection moulding, of a plastics or other suitable material.

The housing 8 includes a generally box-like main portion 9 having a bottom face 10, a short, stepped, tubular sealing portion 11 extending away from the main portion 9 for engaging with and providing a seal to the wall 4 and a generally long, thin sensing portion 12 (herein referred to as a "vane", or "finger" or "insert") extending away from the sealing portion 11. Some or all of the vane 12 is intended to be inserted into the fluid 7.

The main housing portion 9 includes an end cap 13 and may be provided with an opening 14 for allowing access to the inside 15 of the main housing portion 9, for example, to allow a connector (not shown) to be inserted.

The main housing portion 9 may be provided with plate-like wings 16 having screw holes 17 for helping to secure the flow sensor 2 to a pipe 4 or other structure.

Printed Circuit Board Assembly

Referring also to FIGS. 3 to 6, the housing 8 contains a printed circuit board assembly 18 which includes a printed circuit board ("PCB") 19 having first and second opposite faces 20, 21. The PCB 19 is generally paddle-shaped having a main portion 22 and a narrow portion 23 extending away from the main portion 23 of the PCB 19.

The main portion 22 of the PCB 19 generally sits in the main portion 9 of the housing 8 and supports supporting drive and measurement circuit 24 and a power and data connector 25 (or "port") for receiving a corresponding connector (not shown) of the multi-wire connection (not shown) to allow data to read from the flow sensor 2. The connector 25 may, however, be omitted. For example, a power and data cable may be soldered directly to the PCB 19 with connectors.

The narrow portion 23 of the PCB 19 includes first and second contact pads 26, 27 on the opposite faces 20, 21 of the PCB 19. The narrow portion 23 of the PCB 19 supports a field sensor 28, e.g., an inductor which may be on the form of a coil, and a thermistor 29.

Vane

Referring to FIGS. 3 to 9, in the vane 12, the housing 8 is sleeve-like (or "hollow") extending from a first end 31 (or "proximal end") to a second, closed end 32 (or "distal end") along a first axis 33 ("longitudinal axis"). The housing 8 is elongated along a second axis 34 which is perpendicular to the first axis 33.

Figure 6:
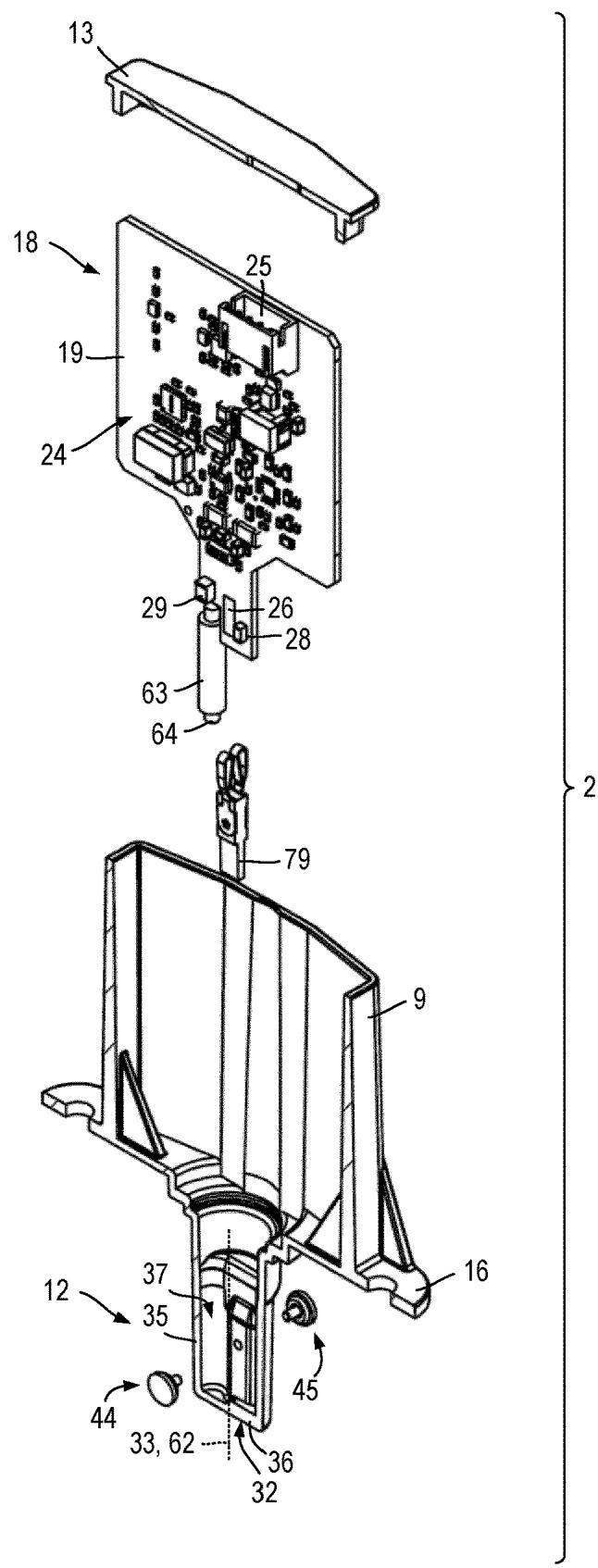
FIG. 6 is a perspective, exploded, cut-way view the flow sensor shown in FIG. 2.

Referring in particular to FIG. 6, in the vane 12, the housing 8 comprises a peripheral wall 35 and an end wall 36 (herein referred to as a "cap") defining a cavity 37 ("space" or "inside").

Referring still to FIGS. 3 to 9, the vane 12 has a rounded front face 38 (or "front"), a rounded back face 39 (or "back") and opposite side walls 40, 41 between the front 38 and back 39.

Figure 7:
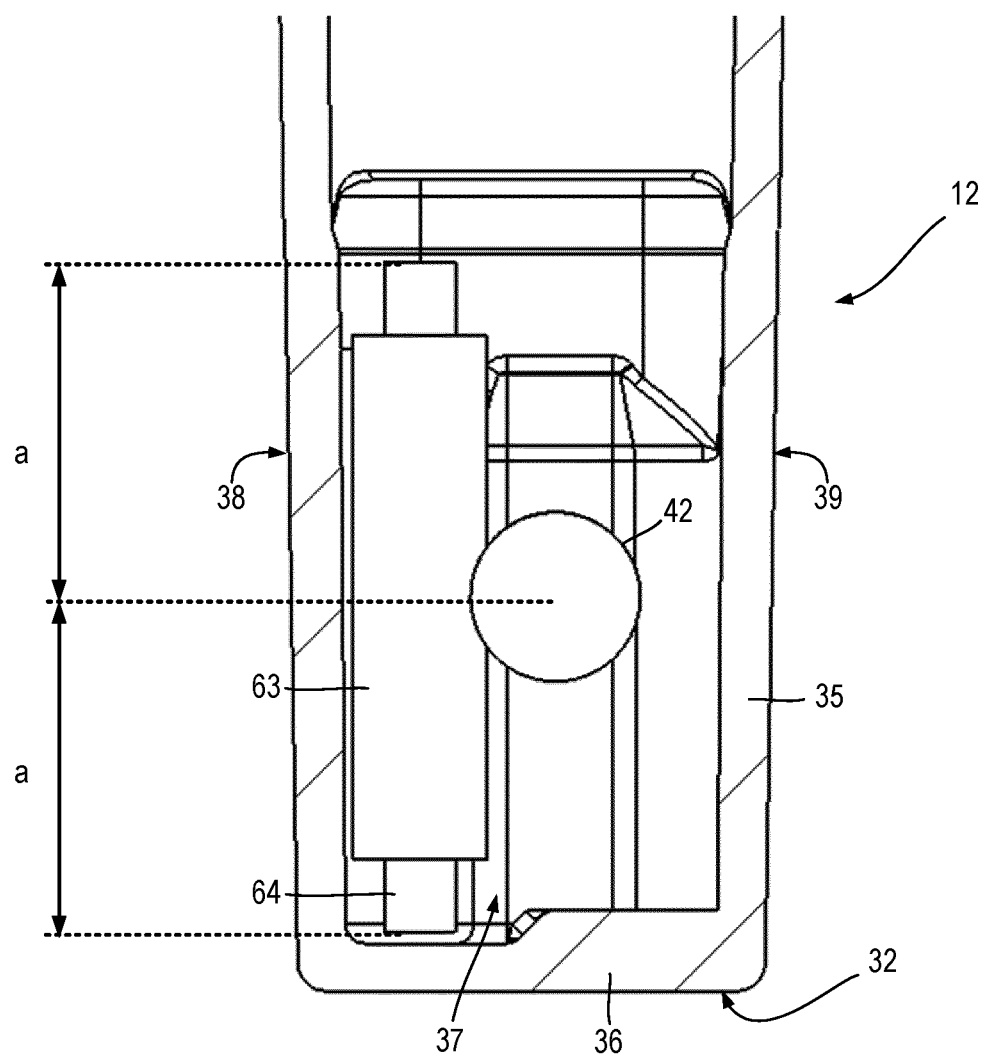
FIG. 7 is a cross-sectional view of a vane of the flow sensor shown in FIG. 2.
Figure 8:
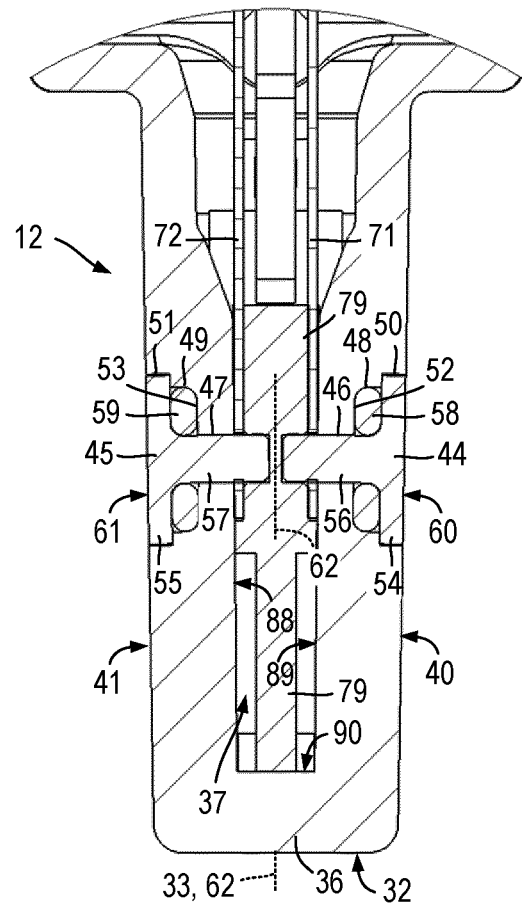
FIG. 8 is a longitudinal cross-sectional view of a vane.

Referring in particular to FIGS. 7 and 8, each side wall 40, 41 has a respective aperture 42, 43 lying approximately halfway between the front 38 and back 39 and about halfway between the ends of a core 64.

The vane 12 may be shaped to reduce or to minimize pressure loss and turbulence. The vane 12 may be tapered upstream or downstream, or in both directions. In any case, the width of the vane 12 perpendicular to the flow (and the axis 33) is preferably minimized. This can help to reduce noise at high flow rates and/or high pressure drop.

Electrodes

First and second electrodes 44, 45 pass from the cavity 37, through the first and second apertures 42, 43, respectively so as to directly contact the fluid 7 (FIG. 1) whose velocity is being measured, from which a volumetric flow rate can be determined.

Figure 9:
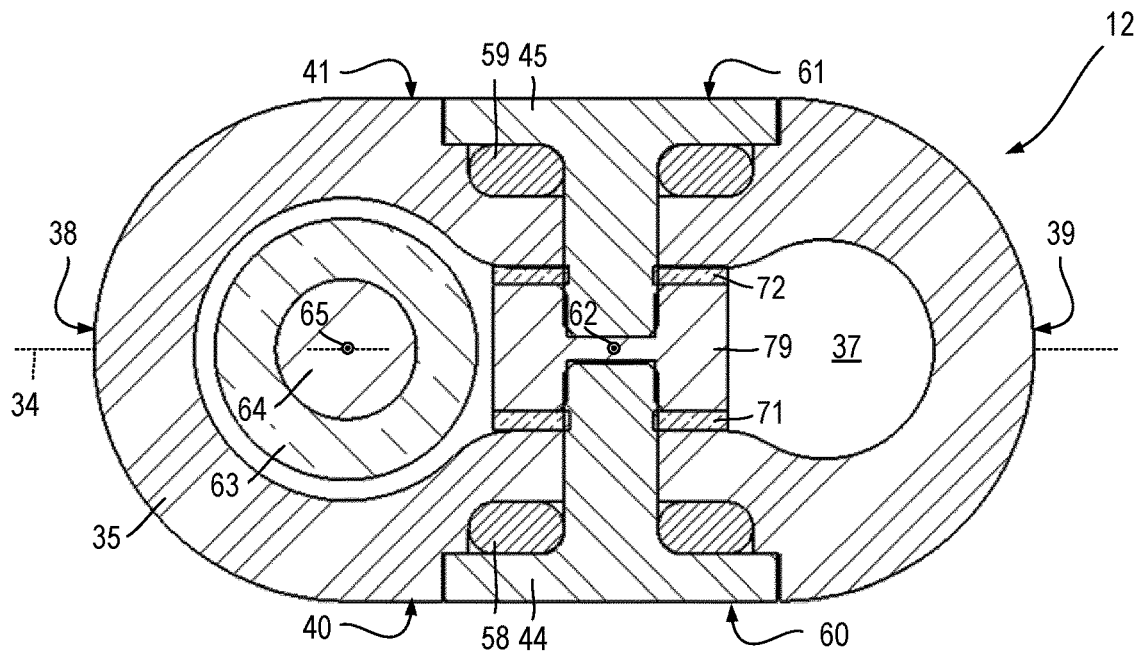
FIG. 9 is a transverse cross-sectional view of a vane.
Figure 10:
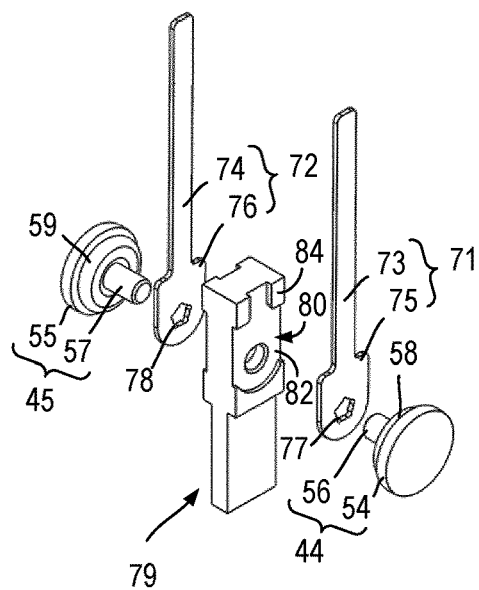
FIG. 10 is a detailed, exploded view of an electrode arrangement including electrode retainers of a first type.

Referring in particular to FIGS. 8 and 9, the apertures 42, 43 take the form of stepped, circular through holes having an inner bore 46, 47, a middle bore 48, 49 and an outer bore 50, 51. The inner bore 46, 47 has a smaller diameter than the middle bore 48, 49 which in turn may have a small diameter or same diameter than the outer bore 50, 51. The inner bore 46, 47 is longer than or about the same length as the combined length of the middle and outer bores 48, 49, 50, 51. However, the inner bore 46, 47 may be shorter. An annular shelf 52, 53 runs between the inner and middle bores 48, 49, 50, 51.

The electrodes 44, 45 take the form of stubs each comprising a disc 54, 55 and a central post 56, 57 ("shaft" or "pin"). Thus, the electrodes 44, 45 can be seated in the stepped through-holes 42, 43. Respective 'O'-rings 58, 59 are interposed between the shelf 52, 53 and the disc 54, 55 to provide a fluid-tight seal.

The electrodes 44, 45 have outer (or "fluid-facing") surfaces 60, 61. The outer surfaces 60, 61 of the electrodes 44, 45 are preferably flush with the side walls 40, 41 of the vane 12. The outer surfaces 60, 61 may, however, be slightly recessed or proud, for example, by a distance between 0 mm and 0.4 mm.

A midline 62, parallel to the first axis 33, runs between the electrodes 44, 45. The midline 62 defines the position of the electrodes 44, 45 between the front 38 and back 39 of the vane 12.

Drive Coil

Referring to FIGS. 3 to 9, a drive coil 63 (herein simply referred to as a "coil") which is wound around a cylindrical core 64 is mounted on the PCB 19. Preferably, there are at least 5 turns and there may be between 5 and 400 turns, preferably between 100 and 200 turns. The core 64 preferably comprises a semi-hard ferromagnetic material with an intrinsic coercivity in a range between 1 and 25 kA/m (1 kA/ms≤$H_C$≤25 kA/m) and a remanence, $B_r$, in a range between 0.6 and 1.5 T (0.6 T≤$B_r$≤1.5 T). Examples of semi-hard magnetic materials include FeCrCo alloy, Vacozet® 258, 3% cobalt steel, 17% cobalt steel, Remalloy and Vicalloy II.

The coil 63 is wound along a central axis 65 which is parallel to the first axis 33. The central axis 65 defines the position of the coil 63 between the front 38 and back 39 of the vane 12. The central axis 65 is offset from the midline 62 along the second axis 34 preferably so that the coil 63 does not lie between the electrodes 44, 45. Offsetting the coil 63 can allow the vane 12 to be thinner compared to an arrangement in which the coil lies between the electrodes 44, 45. The effect of a zero-flow offset (which can arise a result of placing the drive coil off-axis, which occurs when the magnetic field is flipped and which is seen as a pulse) can be avoided by delaying a sampling period until the pulse has decayed.

A drive circuit 24 can be used to drive current bidirectionally through the coil 63 and so change the direction of the magnetic field generated by the coil 63.

The coil 63 and magnetic core 64 may be fitted to an electrically-insulating bobbin or former (for example, formed from a plastics material) such that coil wires are terminated onto metal posts (not shown). This can simplify electrical connection to the PCB 19.

As explained earlier, electrically-conductive electrodes 44, 45 are arranged to directly contact the fluid 7 (FIG. 1). The electrodes 44, 45 are positioned such that a voltage is generated between the electrodes 44, 45 in accordance with Faraday's law if an electrically-conductive fluid 7 (FIG. 1) flows past the vane 12 where a component of the flow is perpendicular to the magnetic field.

The electrodes 44, 45 are made from an inert, non-magnetic metal, such as 316 stainless steel. As explained earlier, each electrode 44, 45 has a shaft 56, 57 which has a smaller diameter than the disc 54, 56 onto which an 'O'-ring 58, 59 is fitted. The shaft 56, 57 is inserted through a hole 42, 43 of slightly larger diameter that goes through to the inside 37 of the vane 12 such that the 'O'-ring 58, 59 is compressed between the vane 12 and the electrode 44, 45 to form a watertight seal.

Electrode Retainers

Referring in particular to FIGS. 10 to 13, the shaft 56, 57 is gripped by a retainer 71, 72 (or "retention washer") on the inside of the vane 12 which maintains compression on the 'O'-ring 58, 59. When the electrodes 44, 45 are seated in the apertures 42, 43, the wetted outer surfaces 60, 61 of the electrodes 44, 45 are flush with the opposite side walls 40, 41 on the outside of the vane 12. This can help to reduce accumulation of and blocking by debris (compared to electrodes which are recessed) which might degrade performance of the flow sensor.

The retainer 71, 72 may take the form of a long, thin strip 73, 74 of flexible metal, such as beryllium copper alloy, having a spatulate end 75, 76 having a hole 77, 78. The hole 77, 78 may be circular having a slighter smaller diameter than the diameter of the electrode shaft 56, 57. The retainers 71, 72 may be seated in a post-like holder 79 having first and second opposite sides 80, 81 having shallow recesses 82, 83 formed by walls 84, 85 contoured to follow the outline of the ends 75, 76 of the retainers 71, 72. The holder 79 is formed from plastic, ceramic or other suitable, electrically-insulating material.

Figure 11:
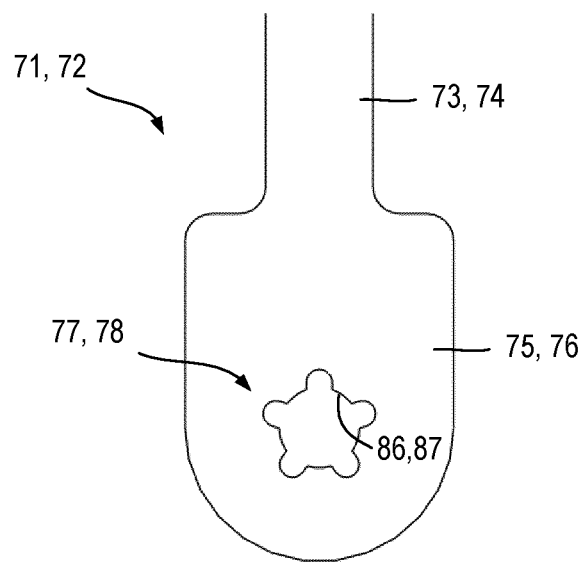
FIG. 11 is a magnified side view of the first type of retainer shown in FIG. 10.
Figures 12, 13:
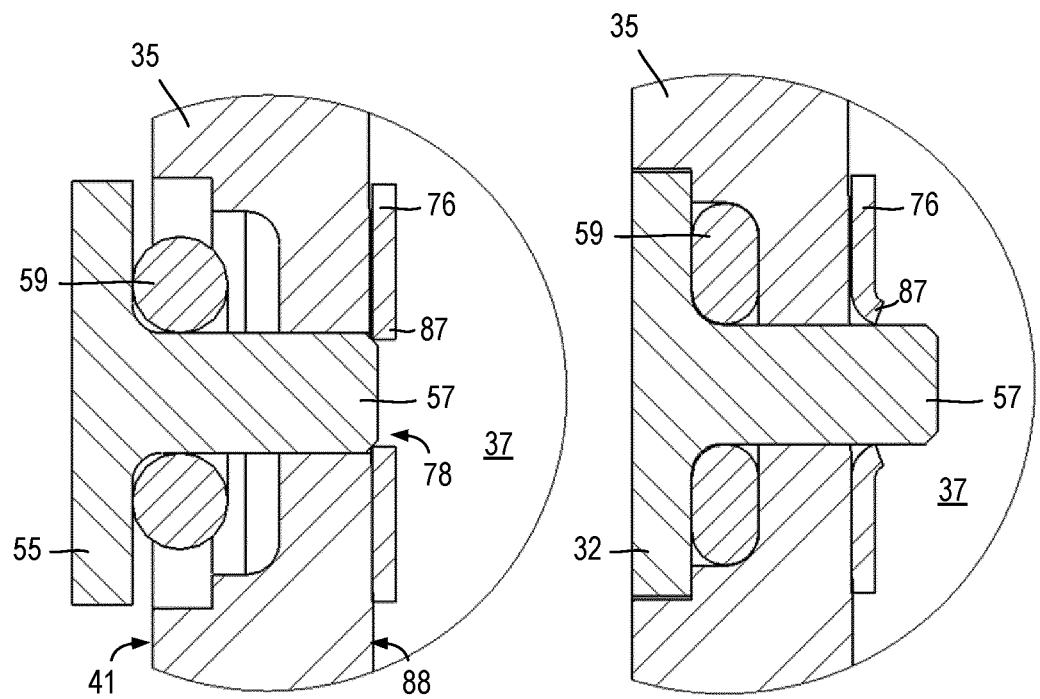
FIG. 12 is cross-sectional view of a vane before a shaft of an electrode is inserted through a hole in a first type of electrode retainer.
FIG. 13 is cross-sectional view of a vane after a shaft of an electrode is inserted through a hole in a first type of retainer.

Referring in particular to FIGS. 11 to 13, the periphery of the hole 77, 78 may be fluted (or "castellated") so as to form a ring of inwardly-projecting teeth 86, 87. Thus, when the electrode shaft 56, 57 is pressed into the retainer hole 77, 78, each tooth 86, 87 flexes in response to the insertion force and the shaft 56, 57 of the electrode can be forced through the retainer hole 77, 78. The force required to flex the teeth 86, 87 during insertion of the shaft 56, 57 is significantly less that the force required to remove the shaft 56, 57 after insertion because the teeth 86, 87 snag the shaft 56, 57 and prevent it from being removed. The teeth 86, 87 have sharp edges and can be formed from a material which is harder than the material used for the shaft 56, 57 so that they dig in rather than slip if a reverse force is applied, for example, resulting from the compressed 'O'-ring 58, 59 or if the pressure in the fluid 7 (FIG. 1) is less than the pressure in the vane 12. The shaft 56, 57 may be forced through the retainer hole 77, 78 and the retainer 71, 72 may be pressed against the inside wall of the vane 12 or a holder 79 so that only the lobes flex.

The electrode 44, 45 with the 'O'-ring 58, 59 may be inserted through the retainer hole 77, 78 until the 'O'-ring 58, 59 is compressed and then the retainer 71, 72 may be pressed onto the shaft 56, 57 from the inside until the retainer 71, 72 is flush with the inside of the vane 12, with the teeth 86, 87 flexing to grip the shaft 56, 57 as hereinbefore described.

Referring again to FIG. 7, the electrodes 44, 45 enter into the vane 12 in a narrow, deep recess 37 (see "cavity" 37 of FIG. 6). This restricts access for fitting a retainer 71, 72 due to a small aspect ratio (w:d) between width, w, and depth, d, of the cavity 37 being about 1:4. The electrode shafts 56, 57 protrude into the cavity 37 inside the vane 12 which is very narrow. The electrode shaft 56, 57 should protrude a sufficient distance into the cavity in order for the retainer 72, 91 to grip it. As a result, the electrode shafts 56, 57 are separated by a narrow distance, less than 0.5 mm, which can restrict access for tools to press the retainers 71, 72 to the shafts 56, 57. The retainer holder 79 can be fitted into the cavity 37 of the vane 12. The holder 79 can help ensure that retainers 71, 72 are pressed tight against the inside side surfaces 88, 89 of the vane 12. The retainer holder 79 is inserted into the cavity of the vane using a simple insertion tool (not shown).

In one example, the retainer holder 79 touches the sides 88, 89, 90 of the vane 12 when fully inserted which can help ensure that the holes 77, 78 in the retainers 71, 72 align concentrically with the holes 42, 43 in the vane 12. In another example, the retainer holder 79 touches neither the sides 88, 89 or the bottom 90 of the vane but aligns the parts concentrically in another way, for example, spacers.

Accurate alignment and tight fit of the retainer 71, 72 and the retainer holder 79 in the cavity 37 of the vane 12 allows the electrodes 44, 45 fitted with 'O'-rings 58, 59 to be easily pressed through the holes 42, 43 and into the retainers 71, 72 simultaneously.

The retainer holder 79 provides an electrically-insulating barrier between the two electrodes 44, 45 that provides additional protection against the electrodes 44, 45 shorting.

Figure 15:
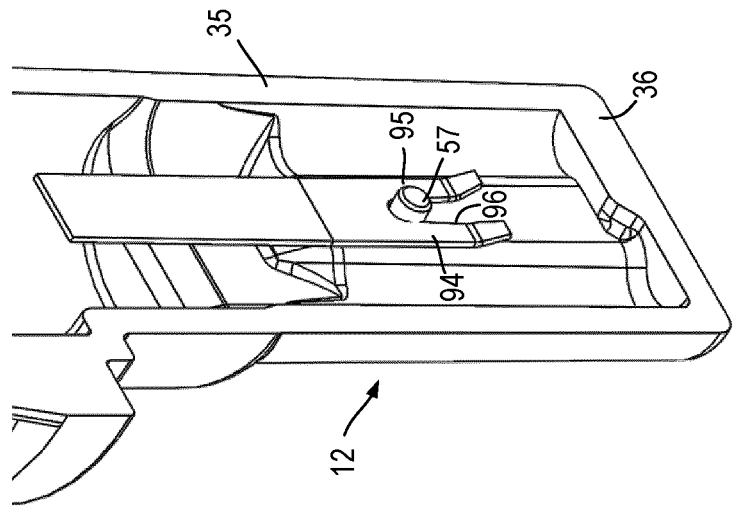
FIG. 15 is a cut-away, perspective view of a vane after a shaft of an electrode is fastened by a second type of electrode retainer.
Figure 14:
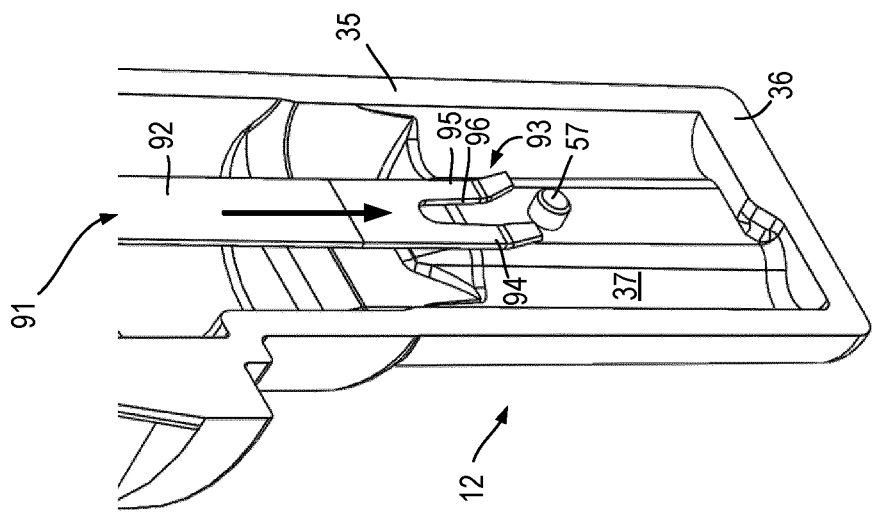
FIG. 14 is a cut-away, perspective view of a vane before a shaft of an electrode is fastened by a second type of electrode retainer.
Figure 16:
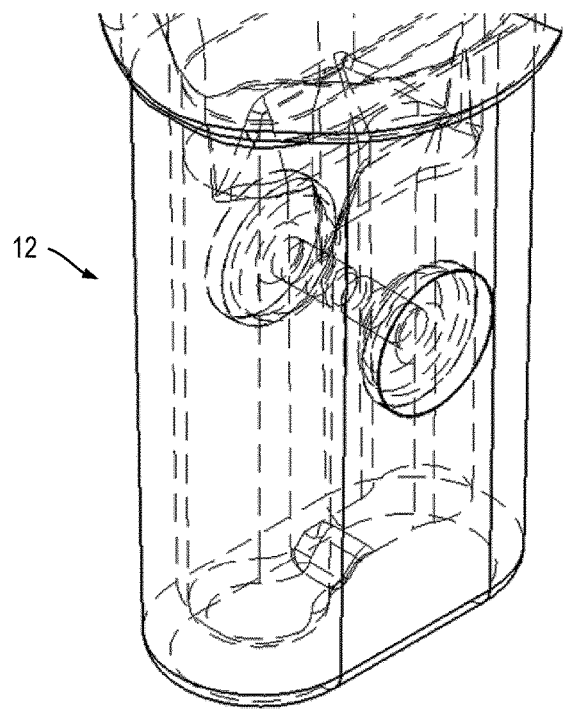
FIG. 16 is a perspective view of a vane.
Figure 17:
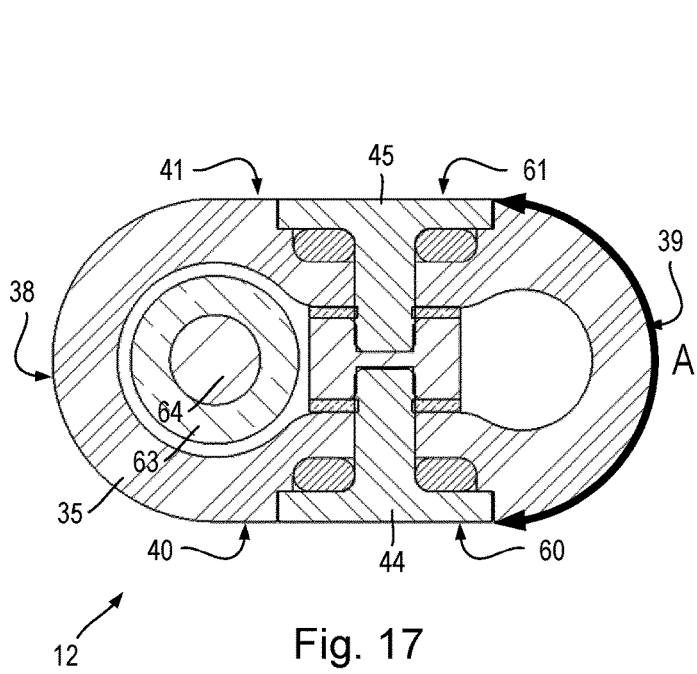
FIG. 17 is a transverse cross-sectional view of a vane illustrating a first path between first and second electrodes.
Figure 18:
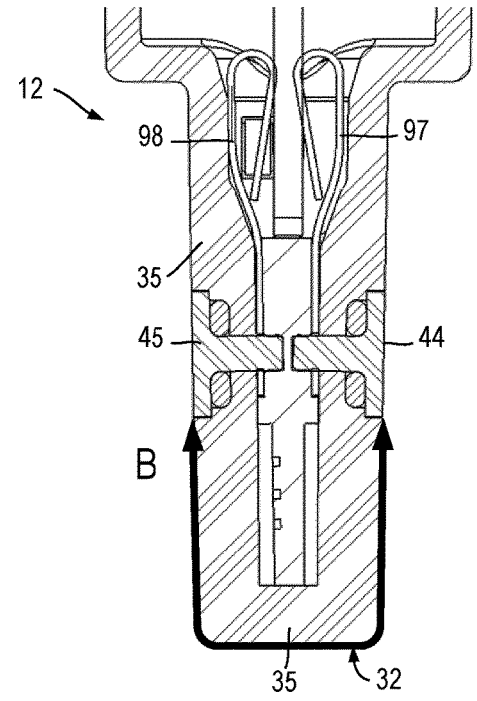
FIG. 18 is a longitudinal cross-sectional view of a vane illustrating a second path between first and second electrodes.

Referring to FIGS. 14 and 15, an alternative retaining arrangement is shown.

A retainer 91 takes the form of a long, thin strip 92 of metal having a forked end 93 comprising first and second prongs 94, 95 defining a tapering slot 96, i.e., which is wider at the end 93 and narrows along the retainer 91.

An electrode shaft 56, 57 (FIG. 10) having an 'O'-ring 58, 59 (FIG. 10) is inserted into the hole 42, 43 (FIG. 3) in the vane 12 so that the shaft 56, 57 protrudes inside the vane 12. The retainer 91 is slid along an inside face of the vane 12 such that the tapering slot 96 increasingly engages with the shaft 57 of the electrode 44, 45 as the retainer 91 is inserted into the vane 12. The width of the slot 96 is sufficiently narrow at or close to the top that it firmly grips the shaft 56, 57 and so prevents the electrode 44, from being removed from the vane 12.

Vane Geometry

Referring to FIGS. 3 to 9 and 16 to 18, a rod-shaped core 64 and long cylindrical coil 63 aligned parallel to the first axis 33, is used to generate a magnetic field which is parallel to the first axis 33 in the fluid outside the vane 12 midway along the length of the coil 63. Electrodes mounted in a plane midway along the length of the coil will measure a voltage difference when flow is axial to the pipe (axis 34). In this case path B is preferentially longer than path A as path B acts as a shunt resistor for the voltage generated across path A. As such, the ratio between the two is preferably maximized in order to increase the voltage across the electrodes. Preferably, B≥2A.

In an alternative embodiment the electrodes may be located on a plane which is perpendicular to the axis 33 and passes below the midpoint of the cylindrical coil 63 and/or the midpoint of the rod-shaped core 64 and/or below the midpoint of the vane 12 or even near the distal end 32 of the flow sensor vane 12. In the region of the distal end the magnetic field is substantially parallel to the axis 33. Fluid flowing along the bottom of the vane 32, perpendicular to the axis 33, will generate a voltage on the electrodes. In this case path B may be shorter than path A.

Pipe Dimensions

Figure 19:
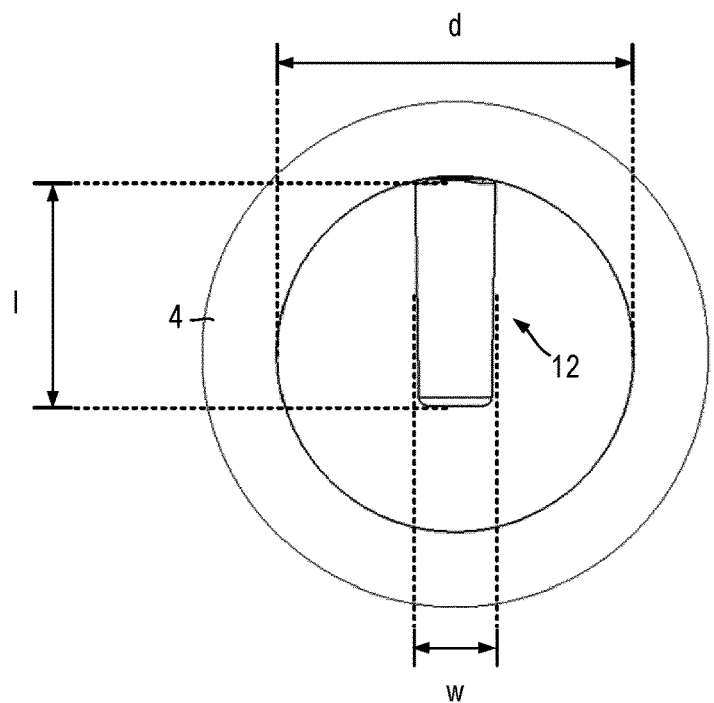
FIG. 19 is an end view of a pipe and a flow sensor.

Referring to FIG. 19, a pipe 4 and the vane 12 of a sensor are shown.

The pipe 4 has an inner diameter, d, and the vane 12 is inserted a length, l, and has a width, w. The pipe inner diameter, d, may be 25 mm, and the vane 12 insertion length can be 16.1 mm and the width, w, may be 5.1 mm. The pipe inner diameter, d, may be between 25 mm and 105 mm.

The vane insertion length, l, may be less than or equal to 18 mm and/or between 8 mm and 18 mm. The vane width, w, may be greater than 0 mm and less than or equal to 15 mm, greater than 2 mm and less than or equal to 6 mm or greater than 3 mm and less than or equal to 4.5 mm.

Figure 20:
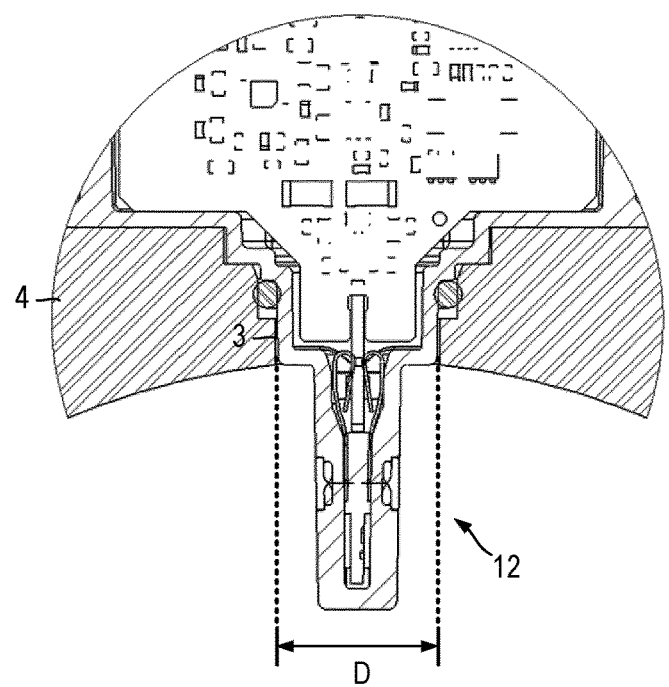
FIG. 20 is a partial transverse cross-sectional view of a pipe and a flow sensor.

Referring to FIG. 20, the pipe 4 may have a stepped aperture 3 having a minimum aperture diameter, D. The minimum aperture diameter, D, may be 10.7 mm.

The minimum aperture diameter, D less than or equal to 15 mm and/or between 5 mm and 15 mm or less than or equal to 10.7 mm and/or between 5 mm and 10.7 mm.

Retention and Electrical Connection to the PCB

Referring again to FIG. 8, the electrode pin 56, 57 protrudes inside the vane 12 and is held in place by inserting it into a metal retention washer 71, 72 with an interference fit. The retention washer 71, 72 may be made of the same material as the electrode 44, 45 to help reduce and even avoid galvanic corrosion.

As explained earlier, the retention washer 71, 72 provides the electrical connection to the PCB 19. The retention washer 71, 72 may be arranged, for example be bent into a loop, to form a spring finger 97, 98 (best shown in FIG. 18) which forms a sprung contact with the PCB 19. The spring finger 97, 98 are urged onto a corresponding contact pad 27 (FIG. 4), 26 (FIG. 5) on the PCB 19.

In some embodiments, the electrodes 44, 45 may be electrically connected to the PCB 19 using an extension (not shown) to the metal retainer part 71, 72.

Separation of Spring Fingers Using a Spacer

A spacer (not shown), for example, formed from plastic or other suitable electrically-insulating material, may be used to separate the spring fingers 97, 98 for the two electrodes 44, 45.

Drive Coil and Core

Figure 3:
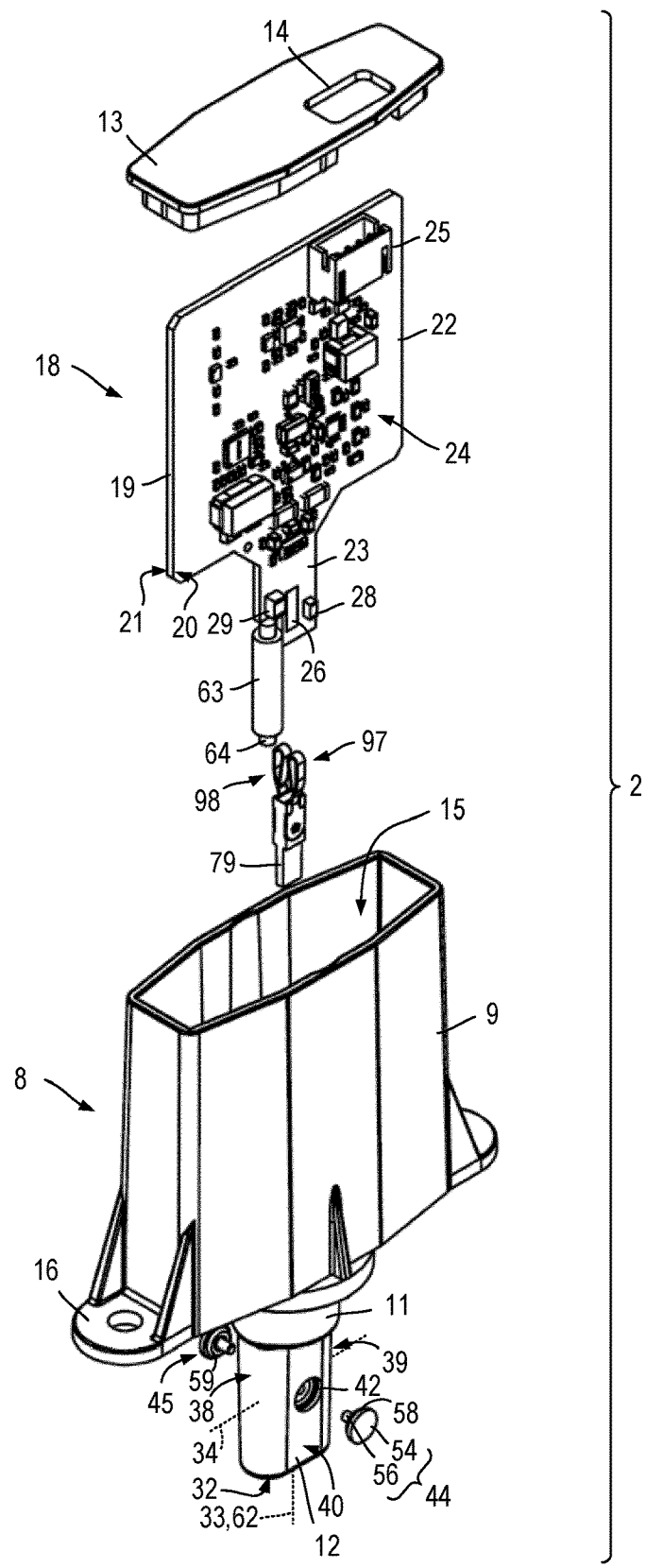
FIG. 3 is a perspective, exploded view the flow sensor shown in FIG. 2.
Figures 4, 5:
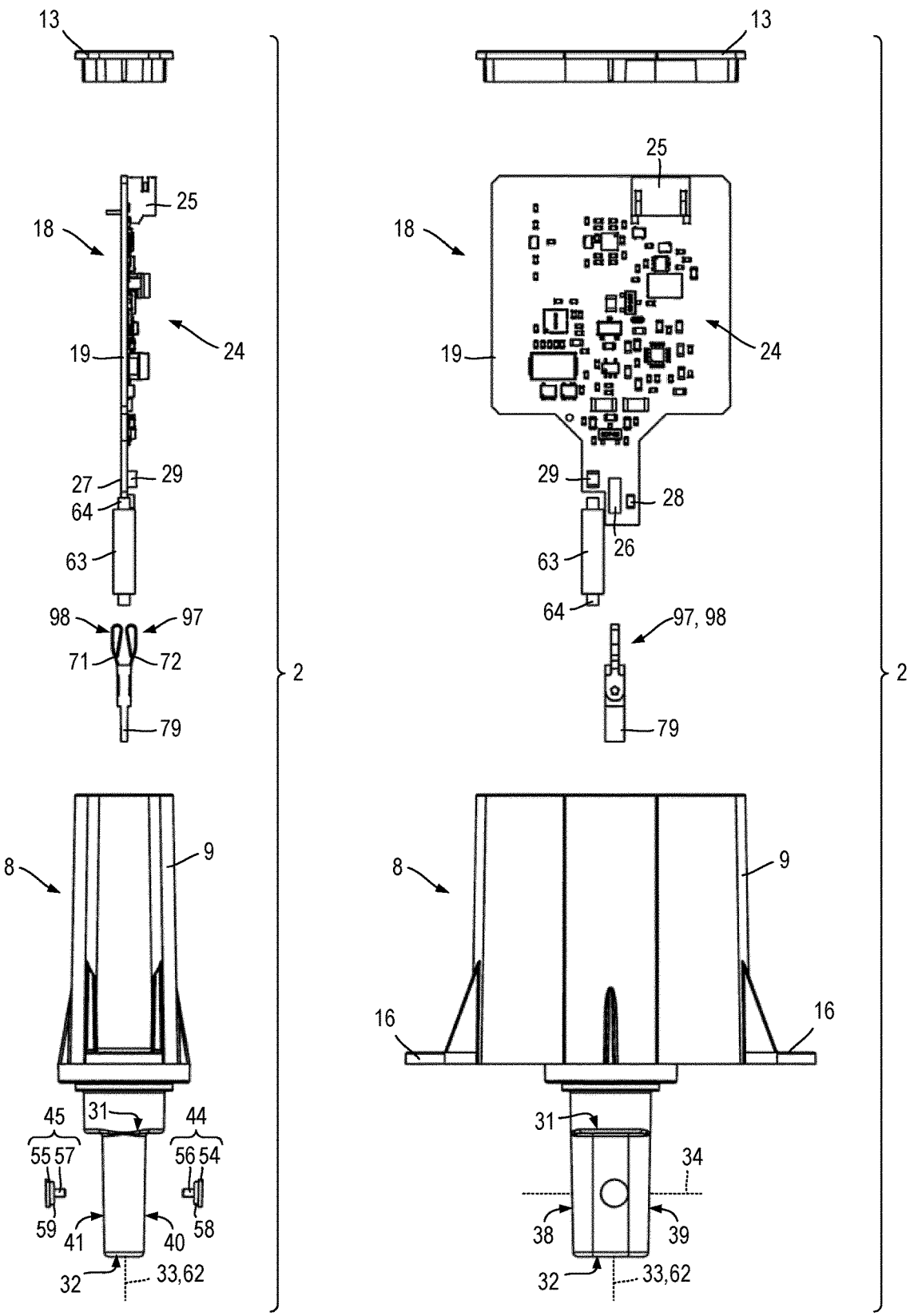
FIG. 4 is end, exploded view the flow sensor shown in FIG. 2.
FIG. 5 is a side, exploded cut-away view the flow sensor shown in FIG. 2.

Referring to FIG. 3, if a magnetic material is used in the core 64, the magnetic material may comprise a remanent magnetic material such that a short drive pulse can be used to flip the magnetization of the remanent material and the current through the coil can remain substantially zero in between pulses. Alternatively, the magnetic material may be a soft magnetic core.

The drive coil 63 serves as a magnetic field generating device and may be wound around a piece of magnetic material. The coil 63, however, may be a self-supporting coil or may be wound on a bobbin or other support.

Temperature Sensor

Referring still to FIG. 3, the flow sensor 2 may include a temperature sensor 29, for example in the form of a thermistor.

The flow sensor 2 may measure temperature and output temperature measurement(s).

Additionally or alternatively, temperature measurement(s) may be used to correct for thermal dependence of the gain or offset of the flow sensor.

Inductive Coupling

Similarly, external devices may be isolated from the sensor electronics 24 using inductive coupler (not shown). The inductive coupler may take the form of coils printed on either side of an insulating FR4 substrate.

Flipping Magnetic Field Direction

As explained earlier, a low-coercivity magnetic material can be used in the core 64. Thus, magnetic field sign can be flipped using a switching circuit by sending a short current pulse through the coil 63 around the magnetic core 64. The current pulse may be generated by discharging a capacitor (not shown), e.g. an electrolytic or a tantalum capacitor, connected to the coil by switches, e.g., bipolar transistors or field-effect transistors.

Alternatively, a soft-magnetic material, e.g., ferrite, or air or ceramic, may be used as the core 64. In this case, the coil energizing current may vary with time as a sinusoid, or a square wave with a duty cycle, or other periodic waveform.

In the case of a core made of semi-hard material, switching is achieved when the current pulse generates a magnetic field H which is larger than the coercive field $H_C$ of the magnetic core. The peak current achievable through the winding is controlled by the total resistance R, the capacitance C and the inductance L of the switching circuit including the winding, capacitor and switches.

The coil may be realized using a conducting wire with external insulation having a diameter $d_w$, arranged in a number of turns $N_t$ in a number of layers $N_l$ around the core 64. The diameter $d_w$ may be 0.22 mm or comprised between 0.1 and 0.5 mm, the number of layers chosen between one and 8. The number of layers and the thickness of the wire have to be chosen to allow the coil to fit in vane 8. The magnetic induction field that can be achieved with a coil depends on the drive voltage, the length of the current pulse, the source impedance of the drive circuit and the coil geometry.

Figure 21:
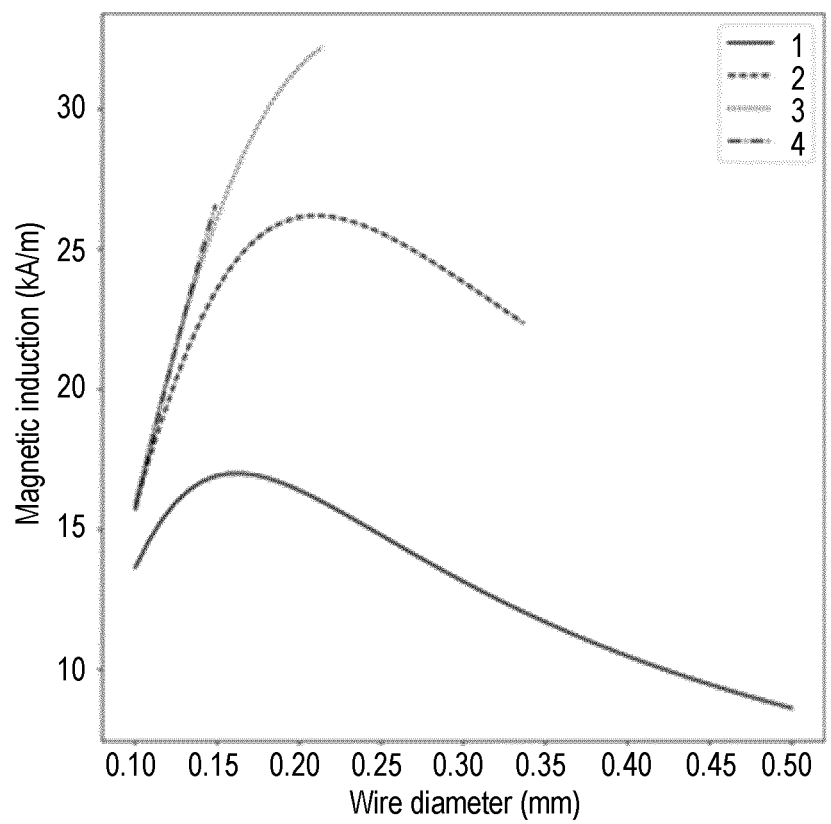
FIG. 21 is a plot of magnetic induction as a function of wire diameter and number of layers.

FIG. 21 shows the magnetic induction that can be achieved as a function of the wire diameter $d_w$ and different number of layers $N_1$. Each curve in the graph of FIG. 21 is terminated when the total coil diameter exceeds the available room in the vane 12. The coil may have one layer, two layers, three layers, or four layers. A three-layer coil may be preferable.

Low coercivity Magnetic Materials

As explained earlier, low-coercivity magnetic materials, namely where $H_C$<25 kA/m, can be used to reduce complexity and cost of components used for the switching circuit.

High remnant field can be used to increase the flow signal.

Thermal annealing can be used to tune the magnetic properties of the alloy.

Table 1 below list suitable semi-hard magnetic materials.

| Magnetic material | Remnant field $B_r$ [T] | Coercive field $H_C$ [kA/m] | Energy Density $BH_{max}$ [kJ/m³] |
|---|---|---|---|
| Vacozet 258 | 1.4 | 3 | 2.5 |
| CoCrFe 1/1 | 0.9-1.3 | 2.0-12.0 | 1.0-9.0 |
| 3% cobalt steel | 0.7 | 10 | 3.2 |
| 17% cobalt steel | 1 | 13 | 5.6 |
| Remalloy | 1.1 | 20 | 8.8 |
| Vicalloy II | 1 | 24 | 9.5 |

Sensor Contamination

The flow sensors herein described do not rely on any mechanical motion or deformation to measure water flow, compared to, for example, differential pressure, mechanical displacement, vortex sensors and ultrasound.

Avoiding recesses can help to reduce accumulation of large deposits of, for example, limescale.

Figure 22:
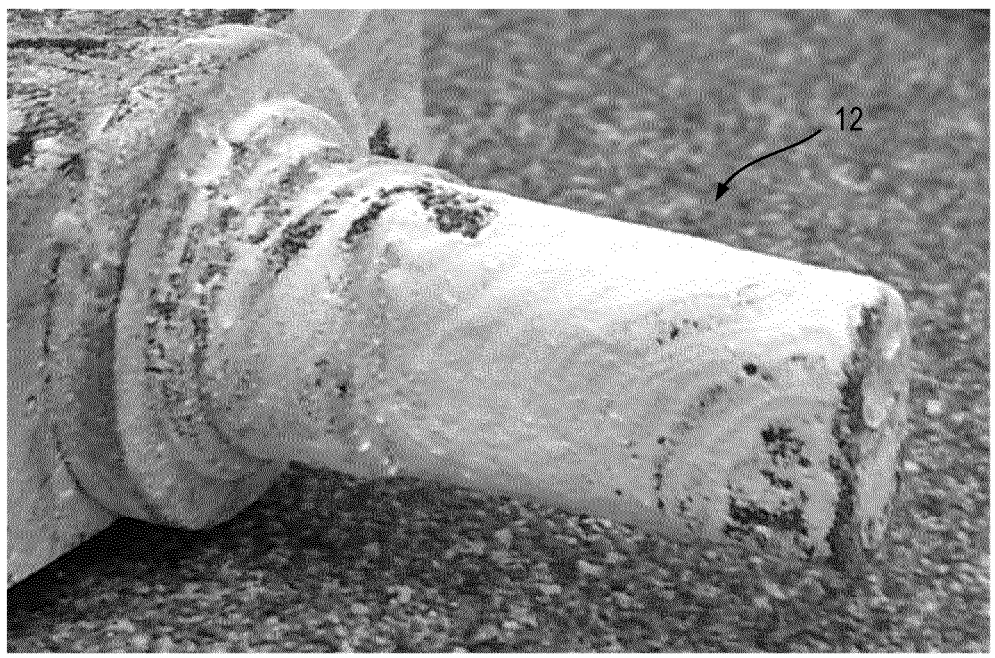
FIG. 22 is an image of a vane of a flow meter covered in limescale.

Referring to FIG. 22, a sensor 2 is shown in which the vane 12 is covered in limescale.

Sensitivity is maintained even when covered in limescale since the layer of limescale is porous and, thus, is able to electrically conduct.

Experimental Data

Figure 23:
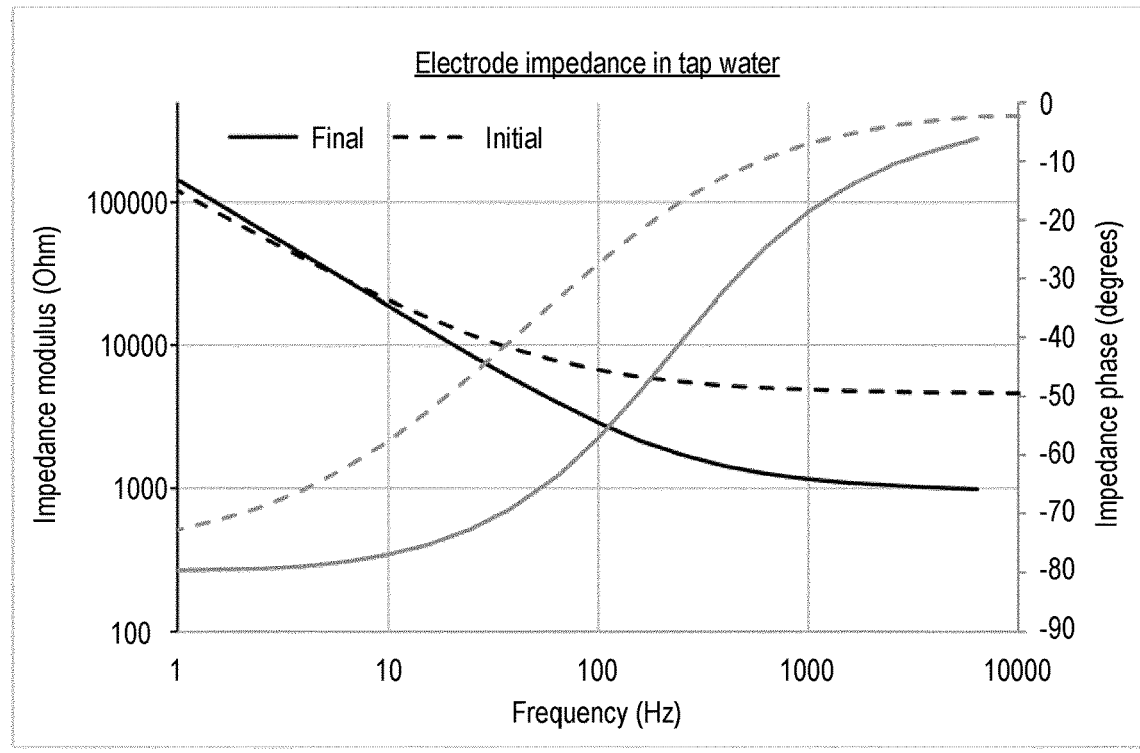
FIG. 23 show plots of impedance modulus and impedance phase as a function of frequency between electrodes for tap water.

Referring to FIG. 23, plots of frequency response of the electrodes before (dashed line) and after (continuous line) limescale coating are shown.

The plot shows impedance does not increase significantly with a lime scale coating between 1 and 9 Hz and the impedance with a lime scale coating reduces above 9 Hz. The frequency of the changing magnetic field may be 1 Hz to 10 kHz, 1 Hz to 100 Hz, 1 Hz to 50 Hz, or 5 Hz to 20 Hz, or 10 Hz to 60 Hz.

Figure 24:
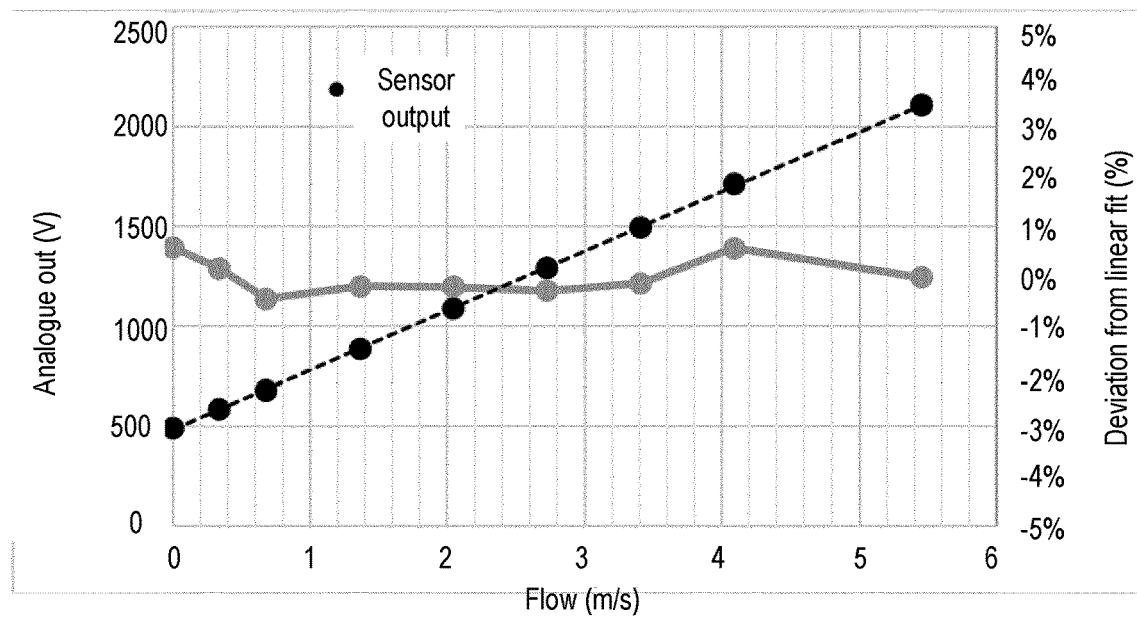
FIG. 24 shows plots of sensor output and deviation from linear fit against flow rate.

Referring to FIG. 24, measured output voltage (black dots) from a flow sensor 2 as a function of flow speed is shown, together a linear fit (dashed line) and deviation from linear fit (grey dots).

Modifications

It will be appreciated that various modifications may be made to the embodiments hereinbefore described. Such modifications may involve equivalent and other features which are already known in the design, manufacture and use of electromagnetic flow meters and component parts thereof and which may be used instead of or in addition to features already described herein. Features of one embodiment may be replaced or supplemented by features of another embodiment.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. An insert-type electromagnetic flow sensor comprising:
a main portion;
an insert elongated along a first axis away from the main portion, and elongated along a second axis which is perpendicular to the first axis;
first and second electrodes supported on opposite sides of the insert; and
a drive coil housed in the insert;
wherein when projected onto a plane perpendicular to the second axis, the drive coil at least partially overlaps with projections of respective inner portions of the first and second electrodes onto the plane perpendicular to the second axis, and wherein the drive coil includes at least five turns.

2. The flow sensor of claim 1, wherein the insert has a width between the opposite sides greater than 0 mm and less than or equal to 15 mm, greater than 2 mm and less than or equal to 6 mm or greater than 3 mm and less than or equal to 4.5 mm.

3. The flow sensor of claim 1, wherein the first and second electrodes comprise first and second stubs respectively, each stub comprising a disc having a centre and a shaft extending away, perpendicularly, from the centre of the disc.

4. The flow sensor of claim 3, wherein the first and second electrodes are each seated in a respective stepped hole in the insert, each step hole having an annular step.

5. The flow sensor of claim 1, further comprising:
a printed circuit board having first and second terminals; and
first and second connectors;
wherein the first and second electrodes are connected to the first and second terminals via the first and second connectors respectively or the first and second electrodes and the first and second connectors are integrated into first and second integrated components, respectively.

6. The flow sensor of claim 1, wherein the insert has a length less than or equal to 25 mm and/or between 8 mm and 25 mm and/or between 9 mm and 17 mm.

7. The flow sensor of claim 1, wherein the insert is insertable through a hole having a diameter less than or equal to 15 mm and/or between 5 mm and 15 mm or less than or equal to 10.7 mm and/or between 5 mm and 10.7 mm.

8. The flow sensor of claim 1, wherein the first and second electrodes are arranged to be co-axial on a centre line, the flow sensor arranged so that when inserted into a flow, the centre line is perpendicular to the flow.

9. The flow sensor of claim 1, wherein the insert is vane-shaped and/or the faces of the insert are parallel where the electrodes are mounted.

10. The flow sensor of claim 1, wherein the insert has first and second ends spaced along the first axis and wherein the first and second electrodes are disposed in a plane midway between the first and second ends.

11. The flow sensor of claim 1, wherein a first distance, A, between the first and second electrodes along a shortest circumference of the insert is less than half a second distance, B, between the first and second electrodes along a path passing around a distal end of the insert (A<0.5B).

12. The flow sensor of claim 1, wherein the drive coil and core are configured such that an energy needed to reverse magnetisation of the core is less than 1 mJ and/or between 0 and 1 mJ.

13. The flow sensor of claim 1, wherein the drive coil has outer diameter less than or equal to 2.95 mm and/or between 1.50 mm and 2.95 mm and a length less than or equal to 14 mm and/or between 7 mm and 14 mm.

14. The flow sensor of claim 1, wherein the first and second electrodes have first and second faces respectively which are outwardly facing and wherein a distance between the first and second faces are less than 15 mm and/or between 2 mm and 15 mm or less than 10 mm and/or between 2 mm and 10 mm.

15. The flow sensor of claim 1, further comprising:
a magnetic-field sensing element.

16. The flow sensor of claim 15, wherein the magnetic-field sensing element is an inductor.

17. The flow sensor of claim 1, wherein first and second faces of the first and second electrodes are flush with corresponding outer surfaces of the insert.

18. A flow measurement system comprising:
the flow sensor of claim 1; and
a wall having an aperture;
wherein the flow sensor is inserted in the aperture.

19. A flow measurement system comprising:
the flow sensor of claim 1; and
an extended structure supporting the flow sensor.

20. The flow sensor of claim 1, wherein the drive coil is self-supporting or wound about a core, the drive coil arranged to generate a dipole magnetic field in order to generate a voltage between the first and second electrodes in response to flow of electrically-conductive fluid through the dipole magnetic field.

* * * * *